United States Patent [19]

Balzano

[11] Patent Number: 4,690,047
[45] Date of Patent: Sep. 1, 1987

[54] TOOL FOR PEELING AND CORING PINEAPPLES AND THE LIKE

[75] Inventor: Savino Balzano, Torino, Italy

[73] Assignee: Metallurgiche Balzano S.p.A., Verres, Italy

[21] Appl. No.: 836,067

[22] Filed: Mar. 4, 1986

[30] Foreign Application Priority Data

Mar. 5, 1985 [IT] Italy ............................ 53094/85[U]

[51] Int. Cl.⁴ .......................... A47J 25/00; B26B 3/00
[52] U.S. Cl. ....................................... 99/542; 30/128;
30/130; 30/301; 30/302; 99/544
[58] Field of Search .................. 99/505, 515, 538–545,
99/547, 593; 30/113.1, 113.3, 117, 174, 130,
178, 300–302; D7/43, 106; 83/651.1

[56] References Cited

U.S. PATENT DOCUMENTS 2,188,362 1/1940 Krilow .............................. 99/545 X
3,540,503 11/1970 McNair .............................. 99/544 X

FOREIGN PATENT DOCUMENTS

53745-B 4/1983 Italy .

Primary Examiner—Timothy F. Simone
Attorney, Agent, or Firm—Bernard, Rothwell & Brown

[57] ABSTRACT

The tool comprises two substantially annular and coaxial blades, an inner one and an outer one respectively, each of which has a frontal cutting edge, and a handgrip for enabling the blades to be pushed into the fruit and possibly rotated so as to separate the core and the skin from the fleshy part through the action of the cutting edge of the inner blade and the cutting edge of the outer blade, respectively. Each blade has associated elongate parts for connecting it to the handgrip which, together with the blades themselves, constitute regions of a single tubular body substantially free from roughness.

6 Claims, 5 Drawing Figures

TOOL FOR PEELING AND CORING PINEAPPLES AND THE LIKE

BACKGROUND OF THE INVENTION

The present invention relates to tools for cleaning fruit and is particularly concerned with a tool for cleaning for consumption fruit having a central core and a skin which are to be thrown away, between which is a fleshy part to be eaten.

SUMMARY OF THE INVENTION

The tool according to the invention is characterised in that it comprises two substantially annular and coaxial blades, an inner one and an outer one respectively, each of which has a frontal cutting edge, and a handgrip which can enable the blades to be pushed into the fruit and possibly rotated so as to achieve the separation of the core and the skin from the fleshy part through the action of the cutting edge of the inner blade and the cutting edge of the outer blade respectively, and in that each of the blades has associated elongate parts for connection to the handgrip which constitute, together with the blades themselves, regions of a single tubular body whose wall is substantially free from roughness.

Characteristics and advantages of the invention, which is intended preferably for use in cleaning fruits such as pineapples for consumption, will become apparent from the description which follows, purely by way of non-limiting example, with reference to the appended drawings.

DESCRIPTION OF THE PREFERRED EMBODIMENT

Figure 1:
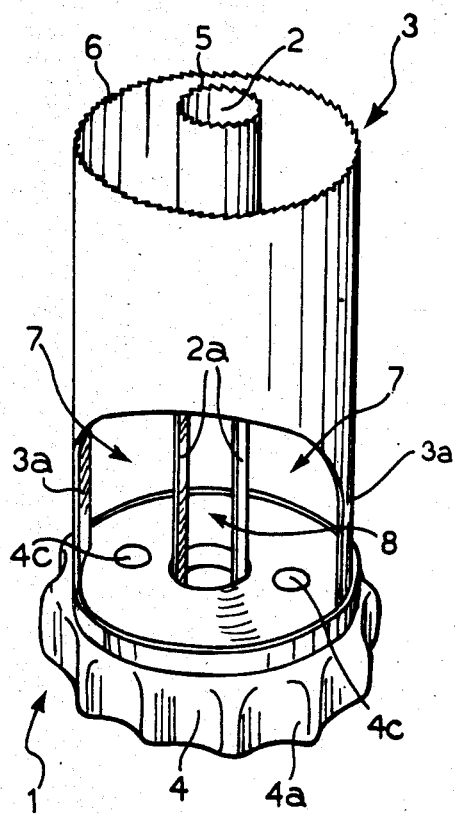
FIG. 1 is a perspective view of a tool according to the invention.
Figure 2:
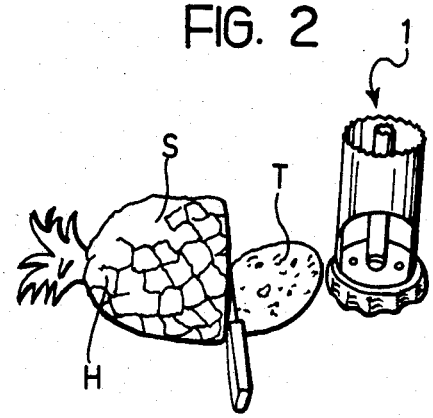
FIGS. 2 to 5 illustrate schematically the sequence of use of the tool of FIG. 1.
Figure 3:
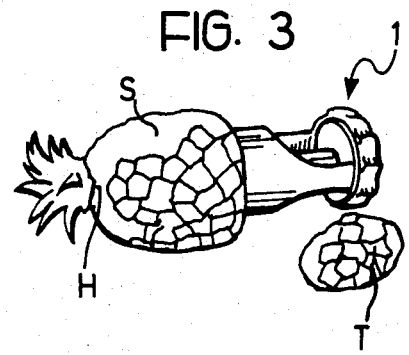
Figure 4:
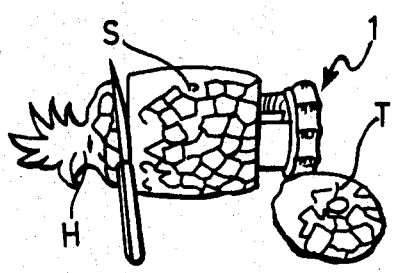

The tool according to the invention, generally indicated 1 in the drawings, comprises, as its essential parts, a pair of annular and coaxial blades 2, 3, an inner one and an outer one respectively, connected to a disc-shaped handgrip 4 by respective elongate connecting parts 2a and 3a.

At their ends opposite the handgrip 4, the blades 2 and 3 have frontal cutting edges with saw teeth.

These cutting edges are indicated 5 and 6.

As shown in the drawings, the outer blade 3 and its parts 3a connecting it to the handgrip 4 constitute regions of a tubular body from which portions corresponding to two U-shaped cut-outs or notches have been removed at the end of the tubular body facing the handgrip 4. In other words, the outer blade 6 corresponds to an end region of the tubular body while the connecting parts 3a correspond to regions of this body between the notches 7 at the opposite end.

The inner blade 2 also constitutes one of the end regions of a notional tubular body from which portions corresponding to two U-shaped notches 8 have been removed at the end facing the handgrip 4.

In practice, both the tubular body defining the inner blade 2 and the tubular body defining the outer blade 3 are constituted by two tubular metal bodies made by casting or, according to any preferred method, from profiled metal sheets closed into a tube with subsequent welding (spot welding) of the facing free edges during the closing operation.

In each case, each blade 2, 3 and the corresponding parts 2a, 3a connecting them to the handgrip 4 constitute regions of a single tubular body substantially free from surface projections.

In other words, when the tool acording to the invention is observed from the end having the cutting edges 5, 6, it can be seen that the connecting parts 2a, 3a are completely hidden—that is, they do not project radially—relative to the corresponding blade.

In the currently preferred embodiment, the notches 7 (and consequently the connecting part 3a) have an extent or depth, measured in an axial direction relative to the tool, equal to about half the overall extent of the tool itself.

The notches 8 (and consequently the connecting parts 2a), however, have a greater longitudinal extent. In other words, the inner blade 2 has a length (measured in an axial direction relative to the tool) which is slightly less than that of the outer blade 3.

Furthermore, the cutting edge 5 of the inner blade 2 projects slightly outwardly of the tool relative to the plane in which the cutting edge 6 of the outer blade 3 lies.

The connection of the tubular metal bodies defining the blades 2 and 3 to the handgrip 4, which is normally of plastics material, by the parts 2a and 3a may be achieved by different techniques. For example, the handgrip 4 may be constituted by a generally dish-shaped outer body 4a into which L-shaped free ends of the connecting parts 2a and 3a are introduced, and by a fixing plate 4b which locks the L-shaped ends within the dish-shaped body 4a. The fixing plate 4b is connected in its turn to the dish-shaped body by screws 4c.

The outer peripheral wall of the dish-shaped body 4a (or at least of the handgrip 4) has grooves or like sculpturing for facilitating the gripping of the tool by the user.

The sequence of use of the tool according to the invention will now be explained with reference to FIGS. 2 to 5, which relate to the use of the tool 1 for cleaning a pineapple.

Such a fruit, in addition to a head part H and a tail part T which are to be thrown away, can be seen to have a core C and a skin portion S which are also to be thrown away, between which is a fleshy part P for consumption, the shape of which may be defined as approximately tubular.

The inner blade 2 of the tool according to the invention has a diameter equal to or slightly greater than the diameter of the core C of the fruit to be cleaned. The outer blade 3, however, has a diameter equal to or slightly less than the section of the flesh of the fruit in the transitional zone between the flesh P and the skin S of the fruit to be cleaned.

Clearly, if account is taken of the fact that the dimensions of the core C and the skin S vary according to the individual fruit considered, the dimensional indications expressed above relate to the average dimensions of the type of fruit.

At the beginning of the cleaning operation (FIG. 2), the user cuts off one of the head or tail parts of the fruit (for example, the tail part T) to expose the flesh of the fruit. The tool 1 is then applied to the end part of the flesh which has been rendered accessible (FIG. 3) and pushed axially to make it to penetrate the fruit.

During the penetration, it is also possible, by means of the handgrip, to impart a slight rotational movement to the tool about its axis, making the cutting action of the toothed edges 5 and 6 of the blades 2 and 3 (FIG. 3–FIG. 4) more effective.

The penetration and advance of the blades 2 and 3 into the fruit causes the separation of the fleshy part P from the core C and from the skin S.

More precisely, the inner blade 2 separates the core C from the flesh P, while the outer blade separates the skin S from the flesh P.

The fact that the cutting edge 5 of the central blade 2 projects slightly relative to the cutting edge 6 of the outer blade 3 makes it easier to position the tool 1 against the fruit and makes the cutting action more effective.

Furthermore, the fact that each blade 2, 3 and the their parts 2a, 3a connecting them to the handgrip 4 constitute regions of a single tubular body which is substantially free from roughness means that the cutting action is achieved exclusively in the two circular regions in which the cutting edges 5 and 6 act. In other words, since the parts 2a, 3a are completely hidden (that is, free from projecting elements) relative to the blades 2 and 3, any scraping, grinding or other damage to the flesh P is avoided.

After the tool 1 has been pushed right into the fruit, the user can separate the other end part (the head H in the example illustrated) by a cutting action and then extract the tool 1 from the fruit.

The tool 1 draws the fleshy part P with it, separating it from the skin S. The flesh P may subsequently be extracted from the tool by gripping parts of the flesh P through the notches 7 between the connecting parts 3a.

The core C, which the tool 1 normally draws with it upon its extraction from the fruit, can also be extracted from the tool 1 by gripping those parts facing the notches 8 and withdrawing it through the inner blade 2 towards the exterior of the tool 1.

Figure 5:
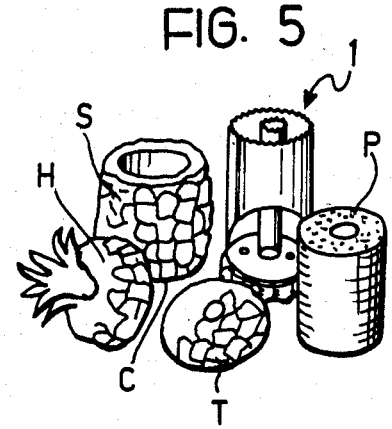

The final result of the cleaning operation, illustrated in FIG. 5, is the complete separation of the flesh P from the other parts of the fruit which are to be thrown away.

Naturally, the scope of the present invention also extends to models which achieve equal utility by using the same innovative concept.

What is claimed is:

1. Tool for cleaning for consumption fruit having a core and a skin which are to be thrown away, between which is a fleshy part to be eaten, comprising inner and outer substantially annular and coaxial blades each comprised of a single elongate tubular body, each of the elongate tubular bodies of the blades having a frontal cutting edge at one end thereof, the tool further including a handgrip connecting the ends of the elongate tubular bodies opposite the cutting edges, the handgrip enabling the blades to be pushed into the fruit and rotated so as to achieve separation of the core and the skin from the fleshy part through the action of the cutting edge of the inner blade and the cutting edge of the outer blade respectively, and in that the tubular bodies of the inner blade and the outer blade each have associated elongate parts that are connected by the handgrip which constitute, together with the edge associated therewith, regions of said single tubular bodies extending from the handgrip to the cutting edge of the associated blade, each single tubular body being defined by a wall that is substantially smooth.

2. Tool according to claim 1, wherein each of the blades constitutes one end region of the tubular body, while the connecting parts associated therewith constitute portions of the body between substantially U-shaped notches formed in the other end region of the tubular body.

3. Tool according to claim 1, wherein the connecting parts associated with the inner blade have a longitudinal extent, in an axial direction relative to the tool, which is greater than the longitudinal extent of the connecting parts associated with the outer blade.

4. Tool according to claim 1, wherein the handgrip is constituted by a generally disc-shaped body having an outer edge which is sculpted to facilitate gripping by the user.

5. Tool according to claim 1, wherein the cutting edge of the inner blade projects outwardly of the tool relative to the plane of the cutting edge of the outer blade.

6. Tool according to claim 1, wherein the cutting edges have saw teeth.

* * * * *